United States Patent [19]
Lammers et al.

[11] 3,726,509
[45] Apr. 10, 1973

[54] MIXING UNIT FOR WATER EXTENDIBLE POLYESTER RESINS OR THE LIKE

[75] Inventors: Sidney G. Lammers, Syracuse; Michael W. Lammers, Union, both of N.J.

[73] Assignee: Dart Industries Inc., Los Angeles, Calif.

[22] Filed: Dec. 3, 1970

[21] Appl. No.: 94,707

Related U.S. Application Data

[63] Continuation of Ser. No. 876,560, Nov. 13, 1969, and a continuation of Ser. No. 60,704, Aug. 3, 1970.

[52] U.S. Cl. ..............................259/7, 259/DIG. 30
[51] Int. Cl. .................................................B01f 7/04
[58] Field of Search.....................259/99, 95, 96, 97, 259/102, 103, DIG. 30, 64, 68, 69, 7; 416/185, 187, 182

[56] References Cited

UNITED STATES PATENTS

| | | |
|---|---|---|
| 2,053,876 | 9/1936 | Pfau..............................259/DIG. 30 |
| 3,139,097 | 6/1964 | Hungerford...................259/DIG. 30 |

*Primary Examiner*—Robert W. Jenkins
*Attorney*—Leigh B. Taylor, Paul R. Wylie, Harold R. Beck and Lawrence I. Field

[57] ABSTRACT

A powered mixing unit adapted for emulsifying water extended polyester resins to such degree that during and subsequent to curing the water extender in the finally molded product will be easily and readily released creating a three-dimensional open-celled resin network. To achieve this desired water release the majority of emulsion particles are ideally sized between about 1 and 5 microns and in the typical rotary mixer operating between about 1,750 and 5,000 rpm such sizing may be accomplished by providing an impeller that occupies between about 3 and 10 percent by volume of the mixing chamber. Similarly, the impeller should be so shaped that only a moderate shear is produced in the chamber during operation.

4 Claims, 4 Drawing Figures

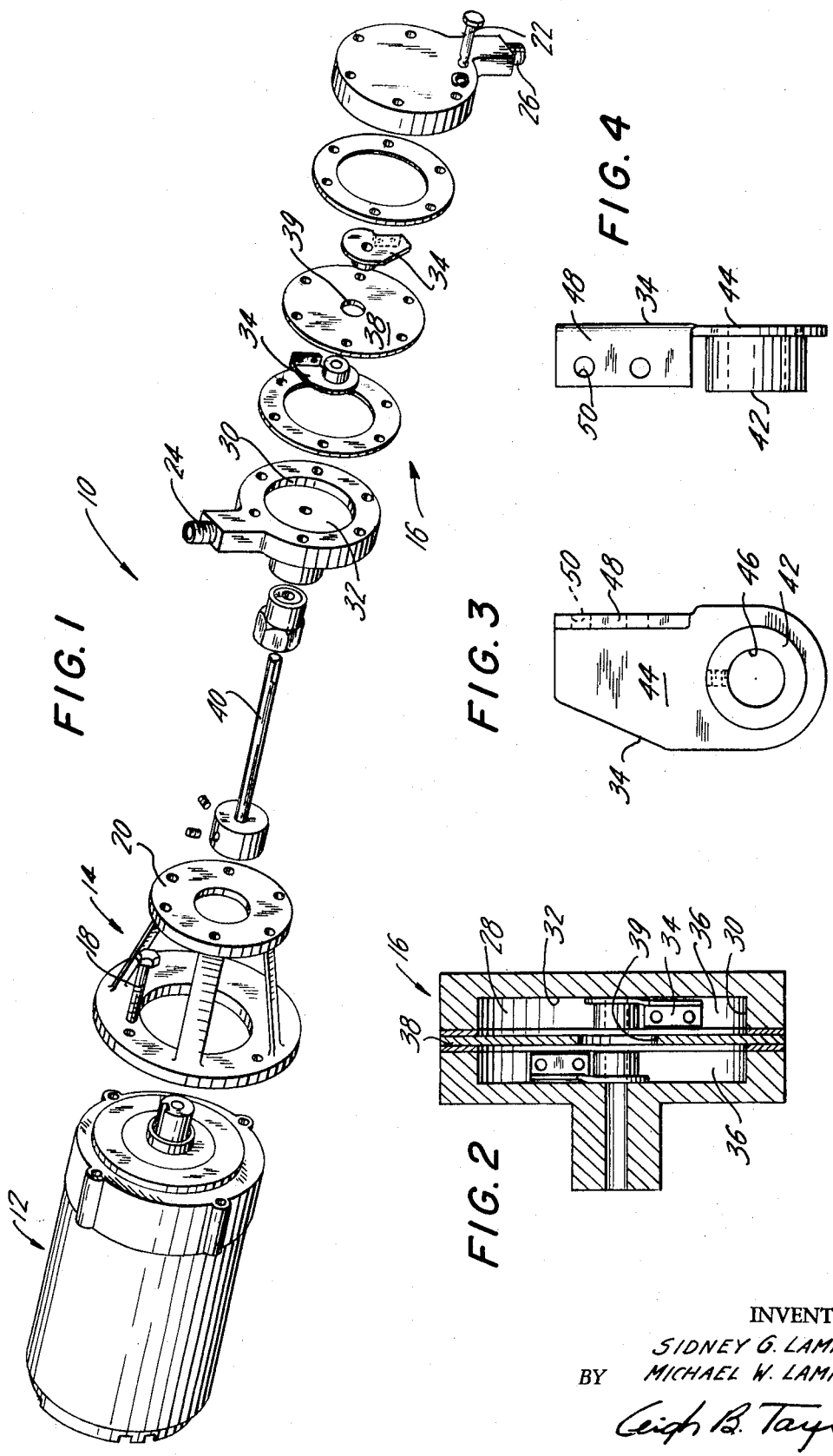

MIXING UNIT FOR WATER EXTENDIBLE POLYESTER RESINS OR THE LIKE

CROSS-REFERENCES TO RELATED APPLICATIONS

This application is a continuing application to copending application Ser. Nos. 876,560 filed Nov. 13, 1969, and 60,704 filed Aug. 3, 1970.

This invention relates to casting or molding compositions and to apparatus and methods for emulsifying such compositions. More particularly, the invention concerns a powered mixing unit for water-extendible polyester resin that is adapted to accommodate the release of water therefrom subsequent to the molding or casting of an article. Further, the invention contemplates a method of operating such unit enabling a subsequent reduction in the water content of a molded article.

A recent innovation in the synthetic molded plastics field has been the introduction of water-extendible polyester resins such as are disclosed in U.S. Pat. No. 3,256,219 and which is incorporated herein by reference. This material quite obviously offers attractive economic advantages for a user since water is an inexpensive a resin extender as there is presently available. Such advantages are further enhanced because it is possible to extend these resins with as much as 90 percent water and to incorporate pigments, oil or water soluble dyes as colorants in the molding composition. Additional features which further enhance the fields of use for such resins relate to the several characteristics that the molded products exhibit and which include their ability to be stapled, nailed, sawed, sanded, machined, adhesively bonded and reinforced with a variety of fibrous and/or granular fillers. Thus, it should be apparent that these resins are adaptable for use in a variety of consumer products to supplant wood, plaster, ceramics, other plastics, etc.

As indicated, water-extendible polyester resins enable the user to produce castings that are either resilient or rigid. Further, for any given resin, it is possible to vary the physical properties by variance of water loading (i.e., ratio of water to resin content). A typical characteristic is the 0.5 to 1.4 percent shrinkage that may be expected when using water-extendible resins. This approximates the shrinkages that are experienced with other unsaturated polyesters, however, when using the water-extendible material, the shrinkage is proportional to the percentage of water employed and the higher the percentage of water that is used, the lower the shrinkage value that may be expected. In this respect, a further advantage has been discovered in conjunction with the removal of water from the molded product. Typical shrinkage values for a water laden polyester (50 percent resin and 50 percent water) are on the order of 1.0 percent; whereas in a similarly composed product from which the water has been eliminated using this process, one may expect between about 0.1 and 0.5 percent shrinkage which represents at least a 50 percent improvement. It is expected that this improvement would be reflected regardless of the amount of water contained in the molding emulsion.

It should be noted that articles incorporating the water-extendible polyester resins as are described in U.S. Pat. No. 3,256,219 and including those that are commercially available, subsequent to casting or molding, tend to experience a rapid loss of water from all exposed surfaces. However, the overall effect of this has been found to be minor. Diffusion of water from below a 3/16 inch depth is extremely slow and even after extended heating at 160° F. water is not driven off rapidly from these cellular composites and is especially well confined in those products which incorporate between 40 and 70 percent resin. Although the water extender may be driven off by extended heating at temperatures approaching 212° F., this in many instances severely damages the molded piece and is therefore unsatisfactory from a commercial point of view.

Further, it should be obvious that because of this, water extension cured castings having a water content of between 50–65 percent will have a density of between 60–65 pounds per cubic foot, approximately that of water. This, although lighter than many typical casting materials, represents a serious disadvantage for the product manufacturer. Therefore, even though the water-extendible resins are very satisfactory in many respects, an inability to control or restrict the final cast product weight and the extremes in shrinkage and warpage are disadvantages of major concern.

The primary objective of this invention, therefore, is to provide an apparatus capable of properly mixing water-extendible polyester resin compositions and perfect the method of operation thereof so that the water content of a cured casting of this material may be effectively and economically controlled and reduced, thus reducing the weight of such castings. Effectuation of such an objective quite obviously will not only further enhance the economics of water-extendible polyesters through a reduction in shipping costs, etc., but will also afford the molder with a product and technique that will produce better shrinkage and warpage characteristics of the molded product.

In summary, this invention, among other things, encompasses a mixing apparatus capable of producing a polyester resin having particle sizes of between about 1 and 5 microns and in which the majority of particles are within the stated size range. As indicated in the copending applications, the introduction of from between about 3–7 percent of certain surface active agents and/or aggregate materials into the emulsion of these water-extendible unsaturated polyester resins also contributes to the water release spoken of but without proper apparatus, mixing such additives will be ineffective.

To achieve the emulsion particle sizes above noted, one must significantly reduce the shearing effect produced by the mixer and retard the degree of mix obtained. For example, mixing speeds, agitator configuration and mixer dimensions may all be varied to accomplish the end result sought. Such mixing retardation may be produced by creating a mixer impeller/chamber volume ratio of between about 3 and 10 percent.

As is mentioned above, the invention relates to the use of water-extendible unsaturated polyester resins as casting or molding compositions. These resins when used as intended are mixed with water and various other additives to form a thermosetting emulsion. As would be expected, the properties of any final cast article incorporating such resins may be determined by the resin selection, the amount of water included, the catalyst system employed, and the filler, if any, that is used therein.

These water-extendible polyester resins are readily available in the trade from sources such as Ashland Chemical Company, Reichhold Chemicals, Inc., and American Cyanamid, as well as others. Some of these may be obtained from the manufacturers in a pre-promoted condition while other producers supply only the resin, leaving the formulating to the user. For example, Reichhold Chemicals, Inc. and American Cyanamid market several promoted polyester resins under the trademarks Polylite and LAMINAC EPX, respectively, and the Ashland Chemical Company offers several unpromoted resins under the designation AROPOL WEP. For a more detailed discussion of these resins and how they may be compounded to produce the results spoken of, attention is directed to the co-pending applications referred to which are incorporated herein by reference.

Additional objectives and advantages will become more apparent upon continued reference to the specification, claims and drawings wherein:

FIG. 1 is an exploded perspective view of a powered mixing unit showing a preferred mixing chamber and impeller construction;

FIG. 2 is a side view of the assembled mixing unit taken in cross-section;

FIG. 3 is a front view of an impeller that is used in the mixing unit shown in FIGS. 1 and 2; and FIG. 4 is a side view of the impeller shown in FIG. 3.

Referring now to FIG. 1, the various components of the mixing unit 10 may be seen to include a motor 12, a mounting 14 and a mixer 16. As is evident therefrom, the one face of the mounting 14 attaches to the motor 12 by means of a plurality of bolts 18 and the other face 20 of the mounting is adapted to retain the mixer by bolt means 22.

As has been indicated above, formation of the new molding emulsion encompasses the addition to the polyester resin of water, promoters (where not incorporated by the resin manufacturer), surfactants, sometimes fillers, and catalysts. These various components are normally brought together in a static mixer (not shown) prior to entering the mixer 16 through inlet port 24. The principle function of the mixer, therefore, is to emulsify the mixture prior to its discharge from outlet port 26.

Surprisingly, the degree of emulsification must be retained below that normally regarded as desirable for plastics such as polyesters and the internal design of the mixer thus represents one area of criticality with respect to this invention. With continued reference to FIG. 1 and in addition thereto FIG. 2, it will be apparent that the mixing chamber 28 defined by side walls 30 and end walls 32 is substantially larger than the impellers 34.

When the mixer is operating at between about 1,750 and 5,000 rpm with a through-put of between about 5 and 50 pounds of material per minute an emulsion in which the majority of particles are of a size of between about 1 and 5 microns can be produced effectively if the volumetric ratio of impeller size to chamber size is between about 2 and 10 percent. This retarded mixing is particularly effectively produced where the internal chamber configuration is as shown in FIGS. 1 and 2. Note that there the chamber 28 is divided into two compartments 36 by a plate member 38. The plate 38 has a center hole 39 to accommodate a shaft 40 upon which are mounted impellers 34 and to enable the passage of mixed materials to pass from one compartment to the other. The shaft extends along the approximate centerline of the mixer chamber and impellers 34 are attached thereto by any suitable means such as lock screws (not shown), so that one is located in each of the chamber compartments closely adjacent the end walls 32.

The impellers 34 (FIGS. 3 and 4) preferably consist of a hub portion 42 from which a first thin wall section 44 emanates. The hub, of course, is center bored as at 46 to accept shaft 40 and the first thin wall section is adapted to be in juxtaposition with and parallel the chamber end walls. A second thin wall section 48 extends from one longitudinal edge of the first section at between from about an angle of 45° to 90°. An approximate 90° position is preferred especially when perforations 50 are provided in the second wall section.

In mounting the impellers 34 on the shaft 40, the outwardly extending thin wall sections 44, 48 should be opposed to one another to retain a balanced impeller assembly. So positioned it also becomes apparent that the second thin wall section 48 is approximately perpendicular to the mixing chamber centerline when viewed as in FIG. 2. Also, it should be obvious, particularly from FIG. 2, that the thin wall sections 44, 48 extend only about between 40 and 70 percent of the radial distance from the chamber centerline to the side walls 30. This obviously minimizes the shearing effect produced in the chamber yet creates the agitation required to suitably emulsify the polyester mixture.

The mixing referred to is undertaken prior to or during final catalization, under conditions of moderate to high shear. This tends to emulsify the water in very fine droplets in such manner that the water, surfactant and promoter are essentially uniformly dispersed with the resin coated thereon. A stable and uniform emulsion is desirable for good performance, however, in one very important aspect of the invention as indicated is that the degree of mixing should be carefully controlled. Typically, commercial polyester molding equipment, for example, employs mixers which operate at between 3,000 and 10,000 rpm. At these speeds for the typical mix time minimum water release is obtained. If, however, the mix speeds are reduced to the range between 1,750 rpm and 5,000 rpm, varying percentages of water will be emitted. And, of course, it should be recognized that the configuration of the mixing chamber, the shape of blades as are above described and the through-put rate all affect final particle size and therefore are determinative of the mixing speed employed.

Emulsion particle size, in theory, therefore effects the water release sought and this aspect is particularly important to the invention. Typical emulsions which will produce this effect include a majority of particles having diameters greater than 1.6 $\mu$ (about 0.0016 mm). Similarly, such emulsions will also exhibit numerous particles which are over 2.6 $\mu$ (about 0.0026 mm) in diameter. Minimal water loss will be attained when a higher percentage of particles are of a smaller diameter. For example, such minimal loss may occur where the majority of particles are less than 1.6 $\mu$ (about 0.0016 mm) in diameter, and very few exceed a diameter of 2.3 $\mu$ (about 0.0023 mm).

Surfactants, when used either alone or when used in conjunction with expanded or solid mineral aggregates or similar substances, tend to effect and control the release of water from the molding or casting as it cures. Similarly, inert expanded mineral aggregates, such as that marketed under the tradename Perlite may be used to assist in the water release making up this invention. It is theorized that such aggregate tends to promote or assist in the formation of large particles in the emulsion and thereby creates a structural network through which the water may escape during and subsequent to curing.

The mentioned aggregate is an inert vitreous substance made up of a volcanic aluminum, magnesium silicate. Although this material will break the emulsion as discussed, it should be noted that control of the emulsion particle size must be carefully maintained for such to be effective. Here, it also appears pertinent to note that the smaller the size of the aggregate, the more effective it apparently is in affecting emulsion particle size.

The typical thoroughly mixed water-extendible polyester composite without the added surfactant, aggregate or other similar additive retains the large majority of its emulsified water. In effect, the web-like inner structure of the composite tends to physically trap and entrain the water globules. The surfactant, aggregate or other emulsion treating material causes the emulsion to break during cure or that the surface tension is so reduced as to enable the water to escape through the net-like structure of the composite.

We claim:

1. A powered mixing unit adapted for passage therethrough of a catalized, promoted and water extended polyester resin and comprising a housing with an internal mixing chamber having inlet and outlet ports and an impeller assembly positioned therein on a shaft extending into said chamber approximately along the centerline thereof, said impeller assembly having a plurality of protrusions including adjacent first and second thin wall sections respectively positioned at between about 45° and 90° to one another as well as extending approximately perpendicularly from the chamber center-line for a distance approximately between about 40 and 70 percent of the distance to the chamber side walls from said centerline, and one of said sections further being in substantial parallel orientation with the chamber end walls so that in operation the majority of particles of emulsified resin discharged at said outlet port are larger than about 1.0 microns and an open cell polyester product is produced.

2. A powered mixing unit according to claim 1 wherein said mixing chamber is divided into two compartments each of which has positioned therein an impeller element.

3. A powered mixing unit according to claim 2 wherein each impeller element has at least one radially extending protrusion.

4. A powered mixing unit according to claim 1 wherein said second thin wall section is perforated.

* * * * *